United States Patent [19]
Bender

[11] 3,908,522
[45] Sept. 30, 1975

[54] PRODUCTION OF BAGS AND SACKS

[75] Inventor: Hugo Bender, Gerolzhofen, Germany

[73] Assignee: Hoechst Aktiengesellschaft, Germany

[22] Filed: June 27, 1973

[21] Appl. No.: 374,081

[30] Foreign Application Priority Data
June 29, 1972 Germany............................ 2231838

[52] U.S. Cl..................... 93/35 R; 93/26; 93/33 H; 93/DIG. 1
[51] Int. Cl.² ..................... B31B 49/04; B31B 1/64
[58] Field of Search .............. 93/DIG. 1, 14, 18, 19, 93/21, 26, 33 R, 33 H, 35 R, 35 VL

[56] References Cited
UNITED STATES PATENTS

| | | | |
|---|---|---|---|
| 2,488,212 | 11/1949 | Lloyd, Jr............................ | 93/DIG. 1 |
| 2,529,847 | 11/1950 | McClellan........................ | 93/DIG. 1 |
| 2,623,441 | 12/1952 | Rose et al............................... | 93/26 |
| 2,800,163 | 7/1957 | Rusch ............................... | 156/269 X |
| 2,883,190 | 4/1959 | Manthey........................... | 271/18 A |
| 3,201,914 | 8/1965 | Lohse et al. ......................... | 93/18 X |
| 3,345,919 | 10/1967 | Kasting et al. ...................... | 93/21 X |
| 3,399,096 | 8/1968 | Ranger............................. | 93/35 R X |
| 3,456,855 | 7/1969 | Mutter................................ | 93/33 X |

Primary Examiner—Roy Lake
Assistant Examiner—James F. Coan
Attorney, Agent, or Firm—James E. Bryan

[57] ABSTRACT

This invention relates to a process for the production of containers from thin-walled, stretched, seamless tubes of thermoplastic material which comprises introducing a collapsed tube into an open clamp in a manner such that the edge of the tube projects beyond the clamp, closing the clamp, and fusing said projecting edge into a seam adjacent the clamp, the extent of the projecting portion of the tube being sufficient to produce a seam of a thickness of 2 to 10 times the total thickness of the superposed layers of film, and the fusing operation being effected at a temperature such that no degradation of the thermoplastic material results. The invention also includes an apparatus for performing the process.

7 Claims, 5 Drawing Figures

PRODUCTION OF BAGS AND SACKS

The present invention relates to the production of bags or sacks from relatively thin-walled seamless tubing of oriented thermoplastic material in which a wide base seam weld is made especially from seamless tubing of stretched, in particularly biaxially stretched, polyesters.

It has for a long time been customary to use thermoplastic materials for packing consumer goods, e.g., foodstuffs. In addition to the simple wrapper, in most cases ready-made bags of plain film are used. In this case either two correspondingly cut-out pieces of film lying one above the other are welded or cemented on three sides, or tubing is first of all formed from a film which is then, often in a continuous method of operation, cemented or welded on the overlapping longitudinal seam. In the last-mentioned method of producing bags, the sections of tubing which have been cut to an appropriate length are cemented or welded. Since the welded and cemented joins are the weak parts of the bags, the last-mentioned type of bag has the advantage that it has only two joining points.

Many methods are available for the production of the bags from unstretched material, in which welding is often preferred to cementing because the operation is simple. Thus, e.g., for welding polyolefin films, the electric pulse process, hot-wire welding, and welding between two heated welding strips may be used. Hot melt adhesives also may be used.

The above-described methods produce, for unstretched thermoplastic materials, bags in which too high a demand is not to be placed either on the strength of the material of the bag or on the welded seams. They are, however, considered completely adequate for many purposes, in their tear resistance, elongation at tear, tear propagation resistance, and the permeability to gases, or water vapor.

If higher demands are placed on both the basic material and the joining points of the bags produced therefrom with respect to, inter alia, the above-mentioned characteristics, the films, in the form of plain films or tubing, may be stretched, either monoaxially or biaxially, depending on the properties desired for the final film, by stentering, tube stretching or simultaneous stretching processes in a wide range of variations.

The disadvantage of most stretched films, e.g., of the thermoplastic materials used on a large scale for packaging purposes, polypropylene, polyamides, and especially polyesters, is that they either cannot be welded at all, or when using current welding processes, e.g., hot wire welding, the weld areas do not meet the desired requirements, e.g., with respect to shock-load, in that they are not strengthened by the stretching of the basic film material.

Previously proposed processes to make stretched thermoplastic films weldable or sealable require subjecting the stretched films to an expensive after-treatment. In this, hot sealing layers have to be applied which to some extent can be applied only to the stretched basic film and produce a good adhesion if additional intermediate layers are applied or intermediate treatment processes, such as corona treatments, are carried out. These steps incur additional expense, however, resulting in increased disturbances in the production of the films and a substantial increase in the cost of the bags.

Primarily there are few shrinkable films, mainly of polypropylene and polyester, which are used frequently today for packaging purposes, in which the seam strength is not adequate in many respects for shock load or shrinkage over the packed goods, even in the case of the above-described hot-wire welding. It has been shown, e.g., in particular in the use of shrinkable polyester films for packing poultry, that the seams are frequently destroyed when putting the bird into the ready-made bag as a result of the shock-load, and on subsequent shrinking, the seams are burst open by the strong stress caused by this shrinking, thus rendering the goods unsaleable.

In order to pack foodstuffs such as poultry into stretched bags, these bags, in the form of tubing, are tied off at one end or are closed by means of a metal clip. For this purpose, however, technically expensive machines for gathering up, tying off, and applying clips are necessary. These bag fastenings also have the disadvantage that damage can easily occur on both sides of the tie or clip closure, which results in increased numbers of rejects in the packed goods.

Furthermore, bags produced in such a manner are difficult to stack as a result of the tie or clip, and are therefore also difficult for further processing machines to handle. Furthermore, the gathered-up ends produce very hard parts which often cause damage to other packages, e.g., when storing in deep-freeze counters.

The present invention provides a process for the production of bags or sacks from thin-walled, stretched, preferably biaxially stretched, seamless tubes of thermoplastic material, wherein the collapsed tube is introduced into an opened clamp in a manner such that the edge of the tube projects beyond the edge of the clamp. The tube is fixed in its position and clamped down by closing the clamp, and the projecting portion of the tube is fused, by heat application, into a fused seam adjacent to the edge of the clamp. The projecting portion of the tube is so correlated to the thickness of the two superposed layes of film material that the thickness of the resulting seam is 2 to 10 times, preferably 2 to 6 times, that of the total thickness of the superposed layers of film. The heat supply is so regulated above the melting point of the thermoplastic material used, with respect to the projecting portion of the tube and the thickness of the tubular film, that a uniform and solid seam is formed by fusion without degradation of the thermoplastic material.

In general, the film has a wall thickness of 6 to 100$\mu$, preferably 20 to 50$\mu$. Using the above-mentioned tubular films, these have an orientation in which they have preferred directions of orientation depending on the direction of stretching and the degree of stretching used. It is of course possible when producing tubing to stretch it longitudinally only in the draw-off direction or, by inflating it, in the transverse direction only. In this manner, monoaxially stretched films are produced which are oriented substantially in the direction of stretching only. If simultaneous or sequential inflation and longitudinal stretching are effected, tubular films are obtained which are oriented in accordance with the degree of stretching both multiaxially on the periphery and in the longitudinal direction. All these types of tubular films may be used to form bags or sacks, especially tubular films of polyamides, polypropylene and in particular polyesters. In a preferred embodiment, the present invention also relates to the production of bags from shrinkable tubular films, i.e., those which have a certain power of recovery on the application of heat and thus can closely surround the packed foods. Particularly suitable here are shrinkable films made of polyesters, e,g., for packing poultry, in which internal diameters of from 60 to 300 mm are of special importance.

Generally, however, the process according to the invention is applicable to all stretched, seamless, tubular films. The quality of the seam is such that its strength is commensurate with that of the basic material which has been improved by stretching. This is not generally the case with the previously proposed bag.

Tests have showed that in bags exposed to a strong shock load during filling, the number of losses could be reduced so as to be 2% or less. Also, in the case of bags which were used as shrinkable packages, there were considerable improvements with respect to a decreased proportion of losses, so that waste could be substantially reduced.

A further advantage of the bags produced by the process according to the invention is that they can be more simply stacked and, compared with bags which have been gathered up and tied off or clipped, are much easier for further processing machines to handle.

It is important in operating the process of the invention that the tubing be introduced into the clamp so that a pre-determined projection from the edge of the clamp is obtained. This projection is dependent on the double wall thickness of the flattened tubing and the thickness of the welded seam to be produced. The projection must be such that after the two superposed open film layers have been fused, the thickness of the seam does not exceed 2 to 10 times, preferably 2 to 6 times, the thickness of the two layers of film. If the projection is made too small or too large, then the seams tear easily and also in the case of too large a projection after shrinking have an ugly appearance. The heat supply should be so regulated that on fusing the superposed layers of tubular film there is produced a welded seam which is as uniform as possible and is not weaker at its ends than in its center.

The temperature to which the material is to be heated is of course dependent on the thermoplastic material used, i.e., on its melting and decomposition temperatures, and must be so controlled that there is no decomposition of the material when fusing takes place. Decomposition or degradation at a given temperature is a time-dependent process. Any decomposition apapears as a discoloring of the welded seam and, e.g., when observed under the microscope is shown by the presence of carbonization products inside the seam. A seam, containing a very large number of blebs is of low value as regards strength; a seam which has a few blebs only is preferred.

Generally, successful operation of the process depends on coordination of the projection with the thickness of the films, and the regulation of the temperature with respect to the thermoplastic material used, whereby the welded seam preferably assume a spherical or droplet shape.

In a preferred embodiment, a predetermined temperature is imparted to the clamped film. Heating or cooling to this temperature is advantageously carried out directly by means of the clamp. Depending on the material used for the clamp, the jaws of which may be, e.g., of aluminum or copper, the regulation of the temperature, as a result of the different heat conductivity of the materials, is effected by additional heating or cooling of the clamp. The appropriate regulation of the temperature is also dependent on the material to be welded and its physical properties, e.g., its shrinkability. It has, for example, provided advantageous in the case of shrinkable seamless tubing of polyethylene terephthalate to set the temperature of the tubing before welding at between 30°C and 60°C. An appropriate preselected temperature setting is also advantageous in achieving maximum strength in the welded seams.

Even though any heat source, such as hot gas, or infrared radiation can be used for the heat supply, it is advantageous to melt the projection which will form the welded seam by means of a gas flame, because in this manner temperatures above the melting point of the thermoplastic material are quickly reached. It is also possible to use suitable, preferably concentrated, laser radiation.

Welding by flame can be carried out by a suitable elongate burner which is positioned along the edge of the clamp.

In a preferred embodiment, however, a gas flame is moved along the edge of the clamp from one end of the film to the other, the two superposed layers being fused continuously. Flame welding produces particularly uniform and durable welded seams.

The process can be carried out in various ways, e.g., the ready-made sections of film, e.g., tubing of appropriate length and width, are conveyed by certain transport means, e.g., tongs or grab arms, between the open jaws of the clamp, the predetermined projection remaining opposite the edge of the clamp, the jaws are closed, the projection is fused, the closed section of the film is removed from the clamp after it has been reopened, and then, if desired, placed on a pile. Although this process produces good results, in practice a continuous operating sequence is preferred, in order to eliminate the premanufacture of the sections of tubing, since in such a case the cut edges are no longer cleanly cut as is shown in the following operating sequence.

An accurately cut edge is, however, also important for the quality and appearance of the seam.

In the preferred continuous operating sequence, a flattened seamless tube from a supply roll is, as described above, conveyed between the jaws of the opened clamp so that after the clamp is closed a predetermined projection remains. As soon as the clamp is closed, the projection is fused by the application of heat, the application of heat is interrupted, the clamp opened and the fused film tubing is further transported by a predetermined length corresponding to the desired length of the bag. As soon as the conveying process is over, the clamp is closed again and the tubing is cut widthwise in such a manner that once again a predetermined projection remains, and the process is repeated.

As in the process described for the sections of tubing, use is made of known means for transporting the tubing, such as conveyor belts, tongs, grab arms, and such similar devices. The opening and closing of the clamp can be effected in cycles by means of e.g., pneumatic, hydraulic or magnetic mechanisms.

In order to obtain an accurate cut edge on the projection, it is advantageous in practice to cut the film according to the predetermined projection by means of a blade cut parallel to the edge of the clamp. To this end the blade is applied at one longitudinal edge of the flattened tube and moved to the opposite longitudinal edge, the cutting tool being subsequently guided back to its original position.

Although the heat supply can be applied to all of the projection simultaneously by means of, e.g., a flat-flame burner, it is preferable in practice for heating to be effected by applying it initially to one longitudinal edge of the projection and moving it along one edge of the clamp to the opposite end of the projection. This produces particularly durable seams with optically a substantially flawless appearance.

When working with both sections of tubing and from the roll it is advantageous to fix the position of the edge of the tubing before it is conveyed into the clamp so as to prevent crooked welds in the bag. This can be carried out mechanically or, e.g., by optical scanning of the edges or of specific register marks.

In practical operation it is also advantageous to maintain constant the draw-off tension of the tubular film when guiding it into the clamp so that any disturbances which might occur during the film transport are prevented.

In a further embodiment of the process, the film drawn off the roll, or the tubular sections to be introduced, are subjected to an electrical discharge before they are conveyed into the clamp in order to free them from the electrostatic charges adhering to them.

Consequently, adhesion of the tubular sections or disturbances in the transport if working from a roll, are avoided. To this end known devices are used, e.g., a corona discharge device.

In a further development of the process, the welded and cut-off bags are subjected to a subsequent stretching process. During the welding step, orientation in the seam and in the zone adjacent thereto is destroyed. In order to reproduce the orientation of the material and thus to bring it back into agreement with the state of orientation of the basic material, it is advantageous to carry out a subsequent stretching process. The strength of the seam is again thereby increased. The orientation can be effected, e.g., by calendering the seam by means of pressure rolls. Practical experiments have shown, however, that a subsequent multiaxial stretching process gives particularly good results. Multiaxial stretching means stretching in both the length and periphery of the seam, i.e., the zone in front of the seam. Such a stretching process can be effected, e.g., by inflating the bag while applying a certain pressure. To achieve a quick stretch orientation it has proved advantageous to carry out the subsequent stretching in a hot atmosphere. Most favorably, the temperatures are maintained at those in which the basic material was stretched. In the case of polyethylene terephthalate tubing, the customary temperatures are, e.g., in the range of from 80° to 90°C.

The process can be carried out so that the ready-made bags are stacked in a pile and stacked in the form of a pile containing a predetermined number. For determining the total number of finished bags, counting devices of a large variety of kinds are used or, e.g., optical or mechanical thickness measurements.

Although the seam can be formed in a variety of ways, it is particularly advantageous for certain purposes to make the seam a curved welded seam with a predetermined radius corresponding to the internal diameter used. Above all when packing poultry or sausage foodstuffs, the curved welded seam is much better suited to the goods being packed than a straight welded seam, since in the latter case the straight corners cannot be completely filled, and after filling and shrinking, unattractive projecting corners remain which are susceptible to damage. The curved welded seams can be effected as appropriate to the filling substance used, employing various radii of curvature.

The following Examples further illustrate the invention:

EXAMPLE 1

Bags were produced from shrinkable, biaxially stretched polyethylene terephthalate tubing (NALOPHAN) with an internal diameter of 120 mm and a wall thickness of $20\mu$. In this case the tubing was closed at the base either by means of hot-wire welding with a nickel-chromium (80/20) strip of 1 mm width, 7.5 mm height, 750 mm length, using 40 amps., or, according to the invention, the projection was fused in a continuous manner by a flame moved along the edge of the clamp. The average value for the thickness of the welded seam was in this case $140\mu$. The bursting pressure measurements of corresponding bags were carried out by subjecting the bags to an impact load. For this a prestressed quantity of air of 1.2 atmospheres gauge was forced into the bag suddenly to burst it. In this process the bag is clamped over a broad slit nozzle, of 50 mm width and total discharge area of 40 $mm^2$, by two clamping jaws 20 cm apart, and by means of releasing a switch, the quantity of air contained in the system is released into the bag. In the nozzle there is a transducer which by means of an attached load amplifier and oscillograph produces a time-pressure diagram.

In the test conditions, a transducer Type 701A–79, 4 pCB/at and a Kistler Type 5001 amplifier and a Hewlett-Packard oscillograph were used.

The values shown in the following Table 1 were obtained:

| Bag welded in accordance with the invention | Hot wire welded bag |
| --- | --- |
| Bursting pressure (atm. gauge) | Bursting pressure (atm. gauge) |
| 0.44 | 0.16 |
| 0.43 | 0.06 |
| 0.42 | 0.04 |
| 0.44 | 0.20 |
| 0.42 | 0.11 |
| 0.44 | 0.08 |
| 0.43 | 0.06 |
| 0.45 | 0.04 |
| 0.44 | 0.14 |
| 0.46 | 0.04 |
| 0.44 | 0.06 |
| 0.45 | 0.10 |
| 0.43 | 0.14 |
| 0.45 | 0.07 |
| 0.45 | 0.04 |

The average value for the bursting pressure measured as described was thus approximately 0.44 atmosphere gauge for the bag of the invention but only 0.13 atmosphere gauge for the hot-wire welded bag. The mean value until bursting was reached in 172 seconds for the bag produced according to the invention while for the hot-wire-welded bag is was reached in only 61 seconds. In all cases the bags were torn at the base seam. As the table furthermore shows, the bag of the invention is very uniform in its bursting pressure values, whereas there are widely differing values in the case of the hot-wire-welded bags. This result shows that there is considerable variation in the properties of hot-wire-welded bags in this test, and in use very markedly differing wastage proportions are to be expected.

EXAMPLE 2

Comparison bags were produced according to Example 1, but with the internal diameter of 135 mm. The seam strengths of the bags were compared, using a draw-off speed of 100 mm/min., a strip width of 15 mm and a span of 5 cm in a standard device for determining the strength of films. The strips were cut at right angles to the welded seam.

A portion of the bag was subjected to a subsequent stretching process by inflating it with air (0.2 atmosphere gauge) at room temperature. The following mean values, which were determined from a plurality of bags, were yielded:

|  | Seam strength (kp) |
| --- | --- |
| Welded according to the invention | 2.4 |
| Welded according to the invention, subsequently stretched | 2.7 |
| Hot-wire-welded | 1.8 |

EXAMPLE 3

45 Specimens of the polyester bag referred to in Example 1 of 120 mm internal diameter and bag length of 50 cm were filled with bratwurst. As a result of the selection of the type of machine used to evacuate the suspended bag, the base seam was briefly shock-loaded by the filling material. No losses were observed whereas comparison tests with hot wire welded bags yielded losses of over 30%.

EXAMPLE 4

Packaging tests with polyester bags according to Example 1 were carried out, the filling material being wiener wurst, bratwurst or blockwurst. The bags were evacuated and closed by a clip, the base seam being shock-loaded during the evacuation process by the particular machine used. The following results were obtained:

350 bags, internal diameter 90 mm, 50 cm long, loss as a result of damaged seam after shrinking: under 1%.

Bag, internal diameter 120 mm, 45 cm long, loss as a result of damaged seam after shrinking: under 0.5%.

160 bags, internal diameter 135 mm, 45 cm long, loss as a result of damaged seam after shrinking: under 1%.

220 bags, internal diameter 180 mm, 45 cm long, loss as a result of damaged seam after shrinking: under 0.5%.

In comparison tests with hot-wire-welded bags, the average losses, depending on the internal diameter, were between approximately 20 and 30%.

EXAMPLE 5

In polyester bags according to Example 1, with an internal diameter of 100 mm, and length of 30 cm, were packed 500 chickens of the 950 g weight class. The losses in trimming, the hardest loading process in the packing, were approximately 1% compared with approximately 30 to 50% in the case of the hot-wire-welded bags.

EXAMPLE 6

Bags were produced from biaxially stretched polypropylene (TRESPAPHAN) by hot-wire welding, and by flame welding according to the invention. For examining the quality of the welded seam, impact tests were carried out on these bags. The bags were filled with 1000 ml. of water, and allowed to drop freely from various heights onto a solid level support. In the case of the bags produced according to the invention, the welded seam burst with average falling heights of approximately 2 m, whereas in the case of the hot-wire-welded bags these falling heights were approximately 30 cm. Further examination revealed that the seam strengths of the bags according to the invention are approximately 85% of the film strength, at an extension of about 57%, whereas the hot-wire-welded bags have a seam strength of about 60% of the film strength at an extension of 30%.

Packing and shrinking tests showed that, as in the case of the polyester bags, the seam strengths of the bags of the invention were substantially higher than those of the bags which were hot-wire welded.

Also, when using stretched polyamide in the production of bags according to the invention there were, in comparison with hot-wire-welded bags, similarly superior results for the described measurements both in packaging and shrinking tests.

As shown by the above-described results, which are only a representative cross-section of many tests, it is for the first time possible by means of the process according to the invention for producing bags, to achieve seam strengths in the stretched bags which make it possible to use stretched tubular films in the packaging field without having to subject these films beforehand to an expensive coating in order to make them weldable.

As a result of the new process it has also for the first time been made possible in packaging to obtain a one-sided closure only, by tying off or by means of a clip.

The present invention also provides apparatus for carrying out the described process, which comprises a transport means for introducing a predetermined length of seamless tubing to a clamp, a clamp comprising an upper and lower portion, means for opening and closing the clamp, means for supplying heat to a projection formed in front of the edge of the clamp for fusing the tubular film, and means for removing the welded bag from the opened clamp.

The jaws of the clamp can, of course, be vertical, when working with apparatus turned at an angle of 90°, in which case the clamp then comprises two side parts.

With the help of the transport means, a predetermined length of the film tubing is guided into the opened clamp which is then closed by a suitable means, a predetermined projection of the tubular film being left in front of the clamp edge. By the use of heating means, the projection is then fused, and the clamp then opened again by suitable mechanisms — as described in the case of closing — and the welded bag carried away.

The opening and closing of the clamp may be effected advantageously by means of the same mechanisms.

The clamp itself consists in the simplest case of two jaws of heat-resistant material, e.g., metals such as steel, aluminum, copper or brass. The means for supplying heat are, e.g., an IR-radiator, a laser or preferably a gas burner.

To guarantee a uniform position of the tubing in the clamp, and therefore to obtain bags with an even seam position, a means for fixing the lateral edges of the tubing may be connected in series to the transport means. In the simplest arrangement these are lateral sheet-metal holders for the tubing, but fixing can also be effected by optical or pneumatic controls, e.g., selenium cells. Depending upon the choice of the internal diameter used, the lateral edge controls may be arranged so as to be exchangeable, and preferably movable, as also may be, if desired, the clamp parts.

Any of the usual devices such as conveyor belts can be used in the apparatus as the means for transporting the film. In a preferred embodiment of the apparatus, however, the transport means are tongs automatically moving in cycles in which means are provided for closing the tongs and taking hold of the edges of the film and for opening the tongs. The welded bags are removed from the opened clamp by suitable mechanisms, e.g., gripper tongs. In another arrangement, the transport means are draw-off tongs which open and close automatically in cycles and move backwards and forwards in the draw-off direction, preferably at the same time taking over the function of carrying away the welded bag, a sideways turning movement for laying aside the bag also being provided.

In an advantageous embodiment, the clamp consists of a fixed upper plate and a movable lower plate. The means for opening and closing the clamp may be pneumatic, hydraulic, magnetic or mechanical mechanisms, or if desired also a combination of these, e.g., the clamp may be opened and closed by pneumatic cylinders, or by an electrically produced magnetic field. To facilitate grasping of the fused tubing, means are provided for keeping the tubing centered after opening the clamp. This can be effected, e.g., by resilient plates or similar devices mounted in the clamp portions.

In a preferred embodiment, the means for supplying heat to the projection of tubular film are movable mechanisms which allow the heat source to be moved from one edge of the tubular film, along the edge of the clamp and parallel to it, to the opposite edge of the tubular film. The movement of the heat source is advantageously carried out by corrersponding hydraulic or pneumatic controls, but also can be carried out, e.g., by gear rods, toothed wheels, driving belts and other mechanisms.

Although — as already shown — the heat source may be one of various kinds, practice has shown that in a preferred embodiment a gas burner is installed in the device, which is also — as described above — movably mounted.

In the heat source itself, devices are provided, e.g., precision driving means, which allow regulation of vertical and lateral movement of the source. In order to be able to set the optimum welding temperature for the particular tubing used, in a preferred embodiment devices are installed in the heat source which allow the supply of heat to be regulated. In the case of welding by gas flame, for example, precision regulating valves are provided.

In a further embodiment of the apparatus there are provided in the upper and/or lower portion of the clamp, channels and connections therefor, which make it possible for a heating or cooling medium, e.g., air or water, to be passed through the clamp, so as to impart a predetermined temperature to the clamp.

With the described apparatus it is possible to work with ready-made bag sections, but it has proved particularly advantageous to use a supply roll.

In this case, a piece of film, e.g., of the flattened tubing — corresponding to the desired bag length — is drawn off the supply roll, introduced into the apparatus by transport means, and conveyed into the opened clamp which is subsequently closed.

A cutting tool disposed just before the clamp edge cuts the tubing across its width, the cutting tool being so arranged that a predetermined projection is left opposite the edge of the clamp.

Preferably, the cutting tool is movably mounted so as to be able to alter the desired projection. To this end the cutting tool is provided with mechanisms which enable an alteration of the distance with respect to the edge of the clamp. In the simplest case, set screws are used for this purpose. In practice it has proved particularly advantageous if the cutting tool used is a rigid blade.

In a preferred embodiment of the apparatus, the cutting tool is provided with mechanisms which enable it to move from one edge of the tubular film, along the edge of the clamp and — in accordance with the desired projection — parallel to the same, to the opposite edge of the tubular film. These mechanisms may be the same as those described for moving the heat source.

In a further arrangement of the apparatus, the cutting tool is resiliently braced against a roller guide adjacent to the edge of the clamp.

In order, e.g., to keep constant the draw-off tension of the film tubing in the case of a non-circular supply roll and in view of the inertia of the roll during operation in cycles, there is positioned between the supply roll and the actual welding device a known device for keeping the tension constant, this preferably consisting of a compensating roller.

Since the thermoplastic film used very easily becomes statically charged, e.g., during winding, it has proved advantageous in practice to discharge the film before entering the tubing — whether in the form of a section or from the roll — into the welding station, so as to avoid disturbances in operation. For this purpose a corona discharge device is preferably used.

In order to avoid disturbances as a result of renewed electrostatic charge after the bag has been made and is being conveyed away, it has proved particularly advantageous also to position a discharge device in front of the conveying means.

Although — as the foregoing examples show — in many cases completely adequate seam strengths are achieved for practical use, it is in many cases desirable subsequently to stretch the zone just before the welded seam as well as the seam itself in order to further improve the strength of the welded seam.

To this end there is installed in the apparatus between the welding station and the conveying-away device, a subsequent-stretching station. Subsequent stretching of the seam and the zone lying just before it is achieved, for example, by a pair of calendering rollers, heated if desired, this pair of rollers being guided along the edge or transversely to the edge of the welded seam.

Alternatively, subsequent stretching can be carried out at a station which has means for opening the flattened bag, e.g., suction heads, and means for introducing a flow of gas under pressure into the opened bag. For this purpose appropriate nozzles are used.

Although the subsequent stretching described produces a further improvement in the strength of the welded seam when carried out at room temperature, it has proved particularly advantageous if the subsequent stretching is carried out at elevated temperatures, it being usual to employ the temperatures used for stretching the film material. To this end a heat source is arranged inside the subsequent-stretching station in the region of the welded seam.

In order to be able to optimize and set the desired stretching temperature when the film material is changed, the heat source is provided with means for adjusting the temperature. The heat source may be, for example, adjustable hot air or infrared radiation.

In a further arrangement of the apparatus there is connected behind the welding device a stacking device which, when a certain number of bags has been produced, lays these aside in a pile. For this purpose gripper tongs or similar devices are used.

The invention will now be described with reference to the accompanying drawings, by way of example only. The drawings show a particularly simple design of the apparatus omitting all parts which have no connection with the principle of the invention.

Figure 1:
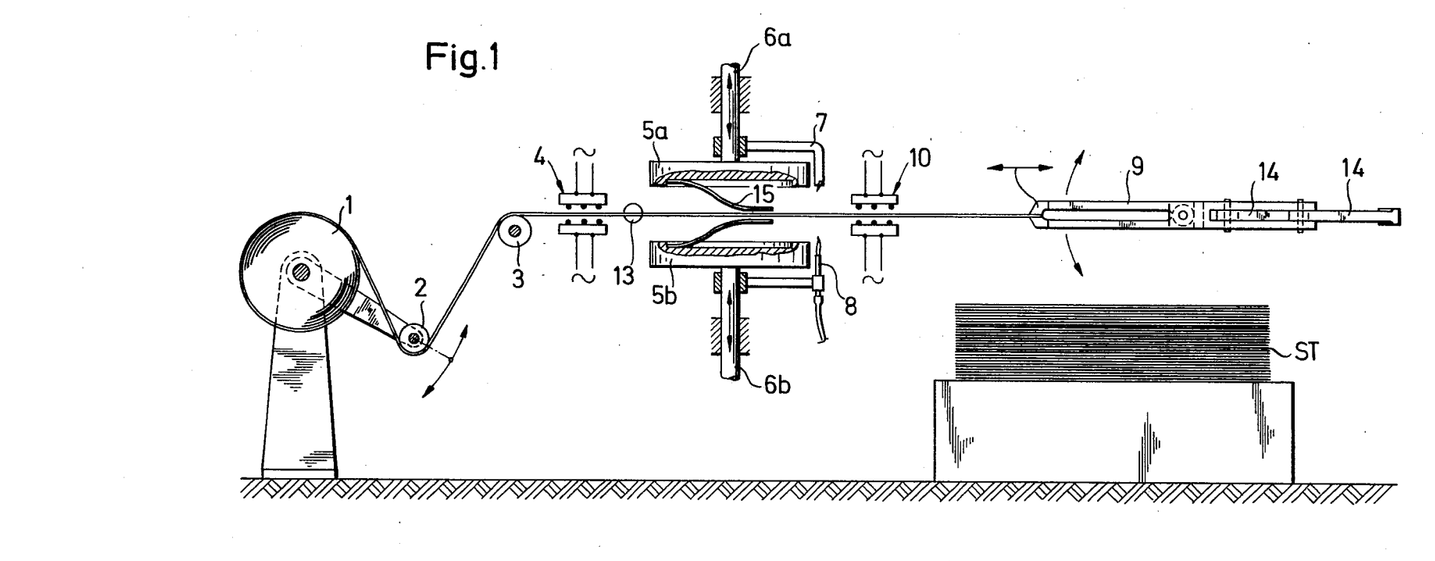
FIG. 1 is a diagrammatic view of an apparatus according to the invention.

A tubular film in the flattened state on the roller 1 is conveyed by the transport means illustrated in the form of gripper tongs 9, which are in cycles opened and moved forwards and backwards (as indicated by the arrows), between the opened portions 5a and 5b of a clamp 5. The tension is kept constant by a compensating roller 2, the web of tubular film being advanced by a roller 3. Any static electricity on the film is discharged by a discharge device 4. The lateral edges of the film are guided by an optical control means 13. Means 6a and 6b (direction of movement indicated by arrows) serve to open and close the upper and lower portions of the clamp. After the clamp has been closed, a cutting device 7 is conveyed along the edge of the clamp, the film being cut to leave a pre-determined projection. Then the projection is fused by means of the heat source 8, here illustrated as a flame, conveyed along the edge of the clamp. After opening the clamp, (both the upper and the lower jaws move in this case), the fused tubing is retained by the holding means, in this case resilient plates 15, until the opened transport means 9 is inserted in the clamp and closed, thus grasping the tubing. After the transport means has moved backwards over a certain distance, the clamp is closed again and the process continued with the cutting step. Before laying aside the finished bag in a stack ST, for which the transport means 9 in cooperation with a swinging arm 14 is used, the bag is again discharged by a discharge device 10.

Figure 2:
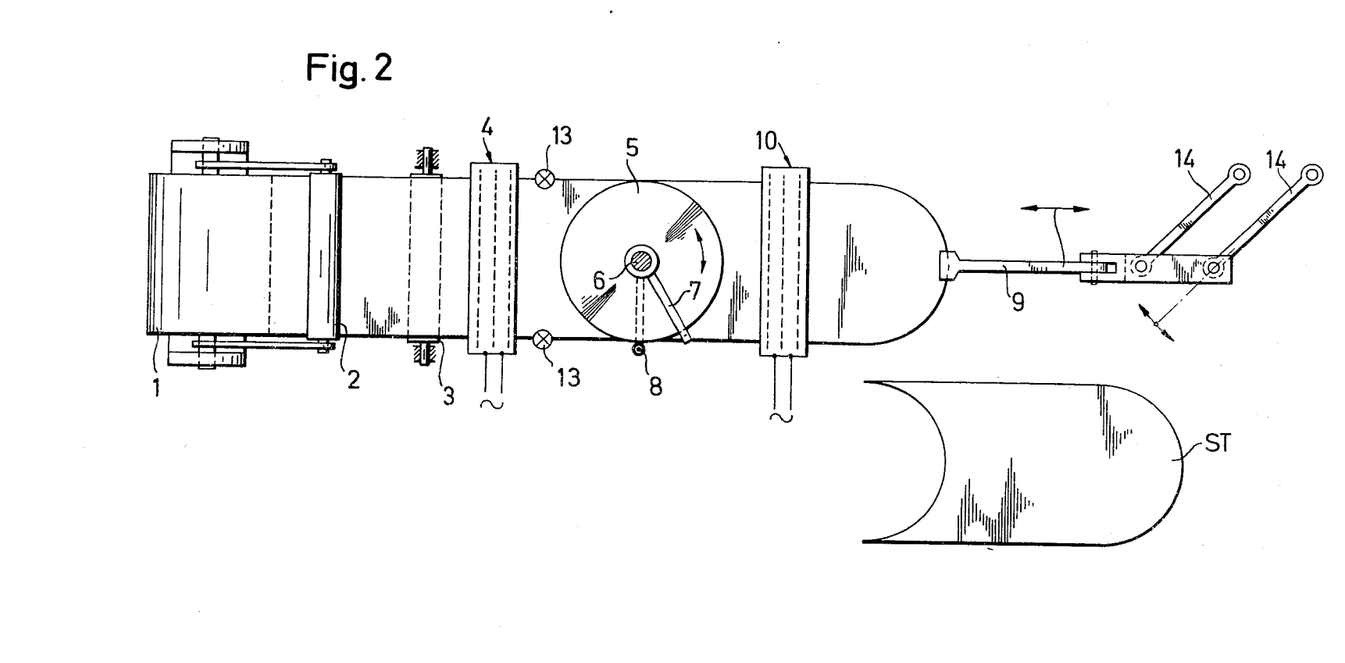
FIG. 2 is a plan view of the apparatus of FIG. 1.

FIG. 2 shows in plan view the apparatus of FIG. 1 in which the wire-like corona discharge devices 4 and 10 can be seen more clearly. The clamp 5 consists of a circular plate so as to produce a correspondingly curved welded seam.

Figure 3:
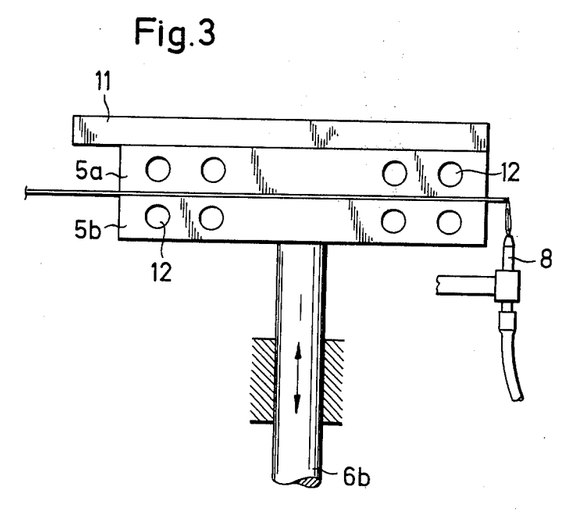
FIG. 3 is a side view of a modified form of clamp.
Figures 4, 4A:
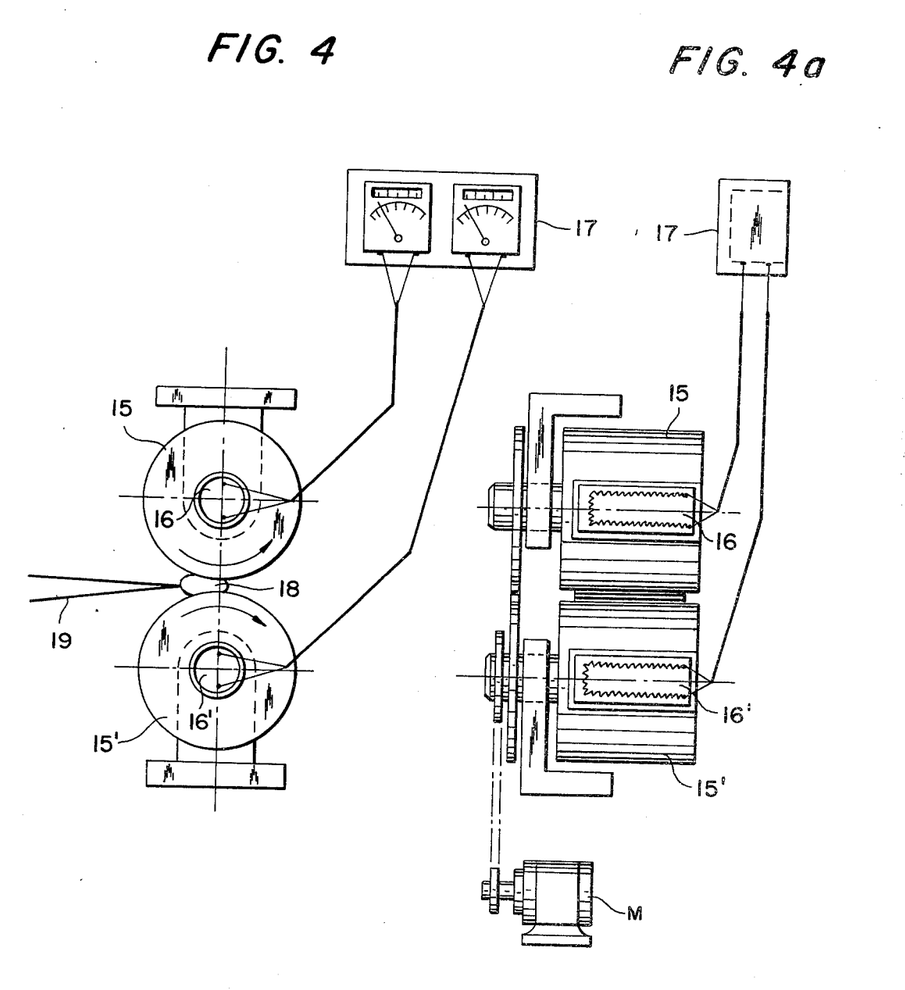
FIG. 4 is a side view of a stretching station.
FIG. 4a is an end view of the stretching station.

FIG. 3 shows, on an enlarged scale compared to the previous figures, a side view of a modified form of clamp 5 with a fixed upper portion 5a, which is secured to a plate 11. In the clamp there are channels 12 for conveying a heating or cooling medium. The heat source 8 is for flame welding. FIGS. 4 and 4a show the stretching station in which the rollers 15 and 15' are provided with the heat sources 16 and 16'. The heat sources are connected to the temperature regulating means 17. The rollers for calendaring the welded seam 18 of the bag 19 are driven by the motor M, which is not shown in FIG. 4 for reasons of clarity.

It will be apparent that the apparatus could be rotated about its longitudinal axis through an angle of 90° and such an embodiment falls within the scope of the invention, as does an arrangement where the film travels vertically through the apparatus.

Generally speaking, the cycles of the individual processing steps must, of course, be brought into line with one another both when using ready-cut sections and when feeding from a roll, e.g., the moving of the transport means, opening and closing of the clamp, and welding and laying aside, in which known mechanical, hydraulic, pneumatic, magnetic, electrical or electronic control mechanisms are used.

It will be obvious to those skilled in the art that many modifications may be made within the scope of the present invention without departing from the spirit thereof, and the invention includes all such modifications.

I claim:

1. A process for the production of containers from thin-walled, stretched, seamless tubes of thermoplastic material which comprises introducing a collapsed tube into an open clamp in a manner such that the edge of the tube projects beyond the clamp, closing the clamp, and fusing said projecting edge into a seam adjacent the clamp, the extent of the projecting portion of the tube being sufficient to produce a seam of a thickness of 2 to 10 times the total thickness of the superposed layers of film, and the fusing operation being effected at a temperature such that no degradation of the thermoplastic material results, and stretching the seam of the completed container.

2. A process according to claim 1 in which the stretching is multiaxial.

3. A process according to claim 1 in which the stretching is effected at an elevated temperature.

4. An apparatus for the production of containers from thin-walled, stretched, seamless tubes of thermoplastic material comprising transport means for introducing a predetermined length of seamless tubing into a clamp means, said clamp means comprising an upper and lower portion, means for opening and closing said clamp means, cutting means for forming a projection in front of the edge of the clamp means, means for fusing said projection, stretching station means for stretching said fused material, and means for removing the welded container from the open clamp means.

5. An apparatus according to claim 4 in which the stretching station includes a pair of rollers for calendering the welded seam.

6. An apparatus according to claim 4 including a heat source in the stretching station which heats the fused seam to a stretching temperature appropriate for the thermoplastic material employed.

7. An apparatus according to claim 6 in which the heat source includes means for regulating the temperature.

* * * * *